(12) United States Patent
Greber

(10) Patent No.: US 12,529,433 B2
(45) Date of Patent: Jan. 20, 2026

(54) CRYOGENIC VALVE

(71) Applicant: Faurecia Hydrogen Solutions France, Nanterre (FR)

(72) Inventor: Frédéric Greber, Ecot (FR)

(73) Assignee: Faurecia Hydrogen Solutions France (FR)

(\*) Notice: Subject to any disclaimer, the term of this patent is extended or adjusted under 35 U.S.C. 154(b) by 0 days.

(21) Appl. No.: 18/635,318

(22) Filed: Apr. 15, 2024

(65) Prior Publication Data

US 2024/0353026 A1 Oct. 24, 2024

(30) Foreign Application Priority Data

Apr. 20, 2023 (FR) .................................... 23 03981

(51) Int. Cl.
| | |
|---|---|
| *F16K 41/10* | (2006.01) |
| *F16K 1/36* | (2006.01) |
| *F16K 25/04* | (2006.01) |
| *F16K 31/126* | (2006.01) |

(52) U.S. Cl.
CPC ................ *F16K 41/10* (2013.01); *F16K 1/36* (2013.01); *F16K 25/04* (2013.01); *F16K 31/126* (2013.01)

(58) Field of Classification Search
CPC . F16K 41/10; F16K 1/36; F16K 25/04; F16K 31/126; F16K 1/30
See application file for complete search history.

(56) References Cited

U.S. PATENT DOCUMENTS

| | | | | |
|---|---|---|---|---|
| 1,779,503 A | * | 10/1930 | Swindin .............. | F16K 27/0236 74/18.2 |
| 3,090,403 A | * | 5/1963 | Heinz ..................... | F16J 3/047 285/227 |
| 3,251,575 A | * | 5/1966 | Campbell ............... | F16K 41/10 251/367 |
| 3,480,285 A | * | 11/1969 | Anderson ............... | F16J 15/36 277/391 |
| 4,553,564 A | * | 11/1985 | Baram ................... | F16K 41/10 137/557 |

(Continued)

FOREIGN PATENT DOCUMENTS

| | | | |
|---|---|---|---|
| DE | 2357018 A1 | 5/1975 | |
| WO | WO-2008128632 A1 | * 10/2008 | ............. F16K 1/446 |

OTHER PUBLICATIONS

WO-2008128632-A1, Machine Translation (Year: 2008).*
Search report for French Application No. 23 03981 dated Oct. 25, 2023.

*Primary Examiner* — Daphne M Barry
(74) *Attorney, Agent, or Firm* — Carlson, Gaskey & Olds, P.C.

(57) ABSTRACT

A cryogenic valve comprises a valve body, a plug, an actuator, a kinematic chain comprising a driving member displaced by the actuator, and a transmission structure transmitting the movement of the driving member to the plug. A tubular bellows is arranged around the transmission structure and has internal corrugations protruding toward an interior of the tubular bellows Protections made of a material with a low coefficient of friction, are placed inside the tubular bellows on the internal corrugations. The protections are displaced with the internal corrugations along an axis of displacement when the driving member is displaced along the axis of displacement.

14 Claims, 14 Drawing Sheets

(56) References Cited

U.S. PATENT DOCUMENTS

| | | | | | |
|---|---|---|---|---|---|
| 5,158,106 | A | * | 10/1992 | McIntosh | F16K 41/10 62/50.7 |
| 5,178,304 | A | * | 1/1993 | Torterotot | F16K 41/10 222/409 |
| 6,305,665 | B1 | | 10/2001 | Coura et al. | |
| 2022/0397213 | A1 | | 12/2022 | Ogawa | |

* cited by examiner

[Fig 1]
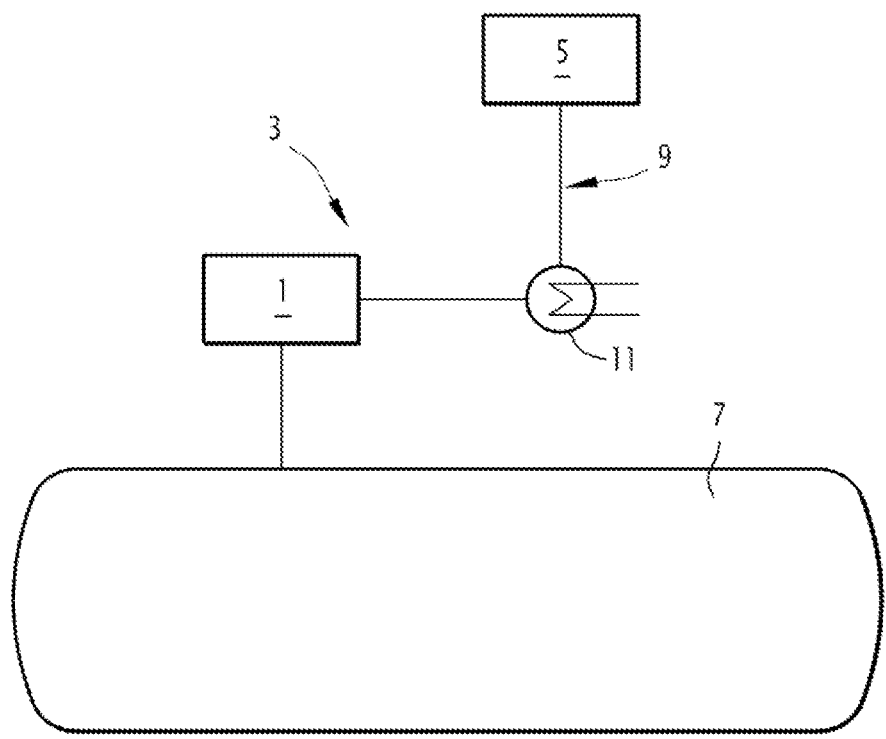

[Fig 2]
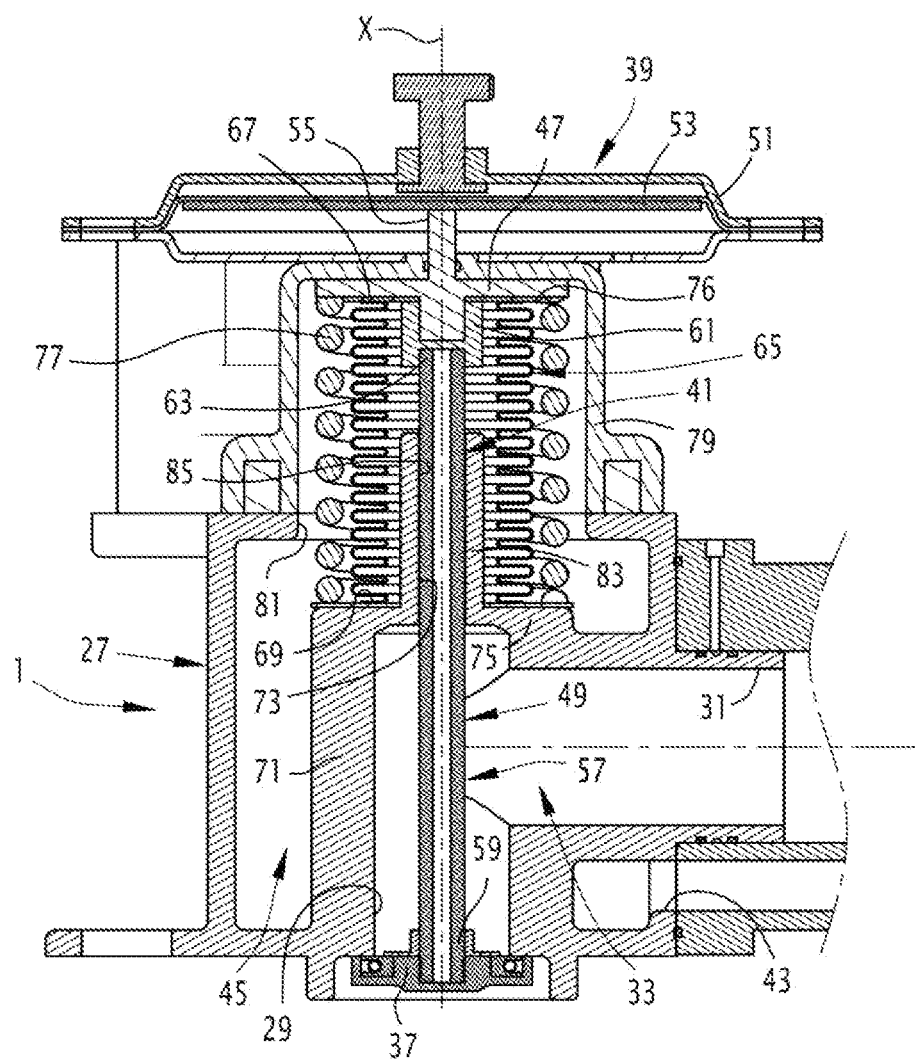

[Fig 3]
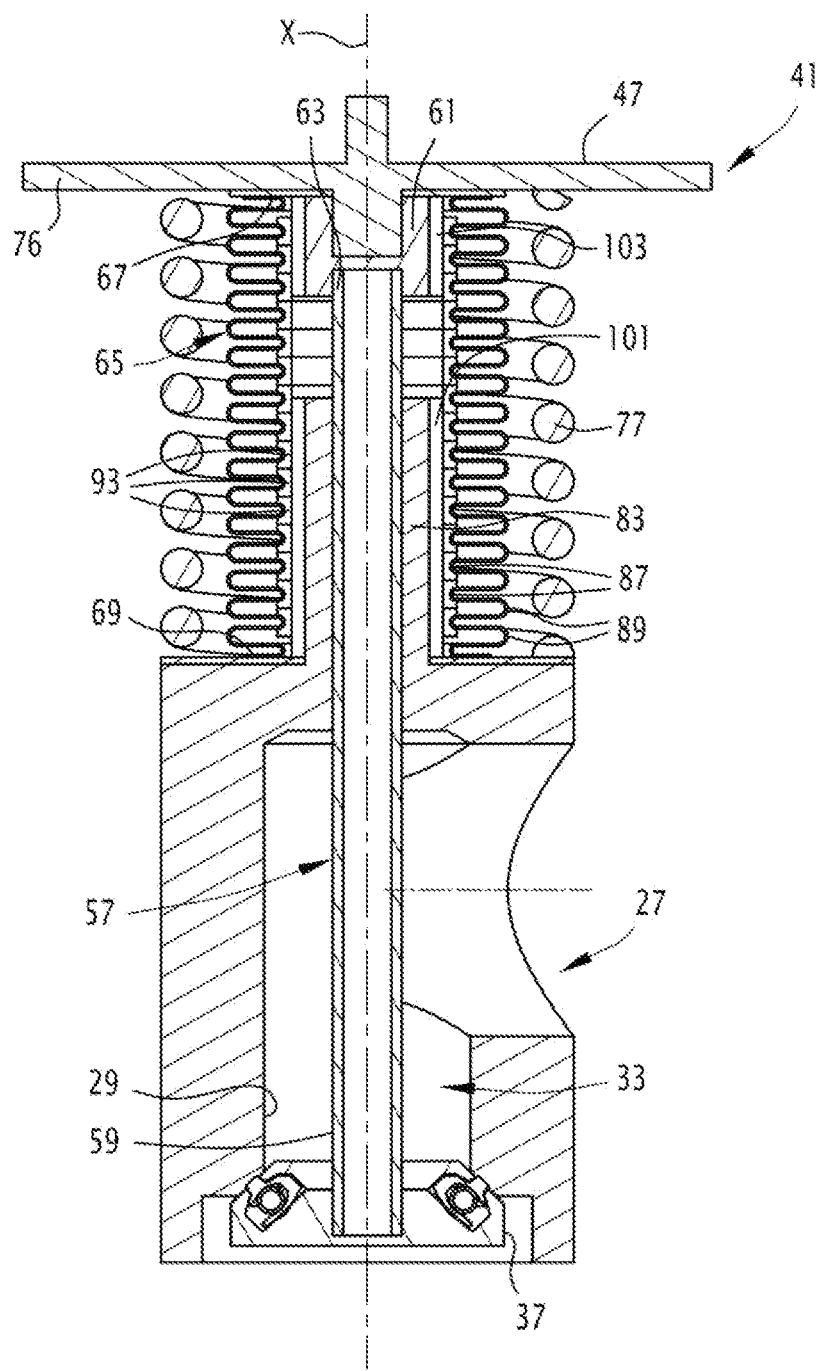

[Fig 4]
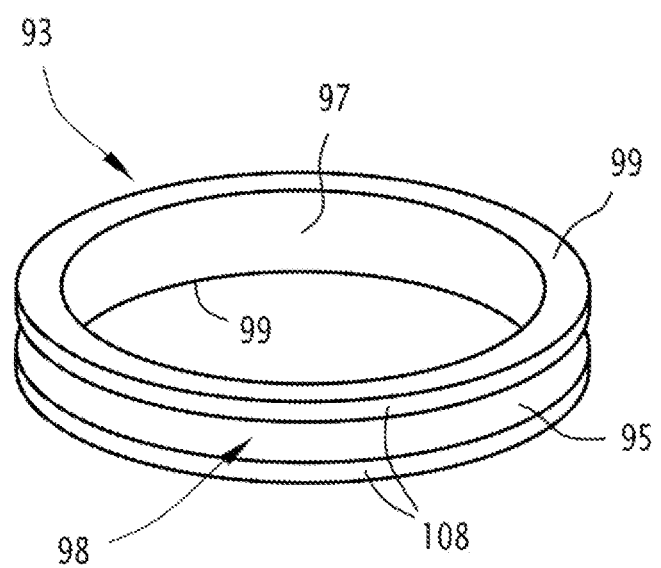

[Fig 5]
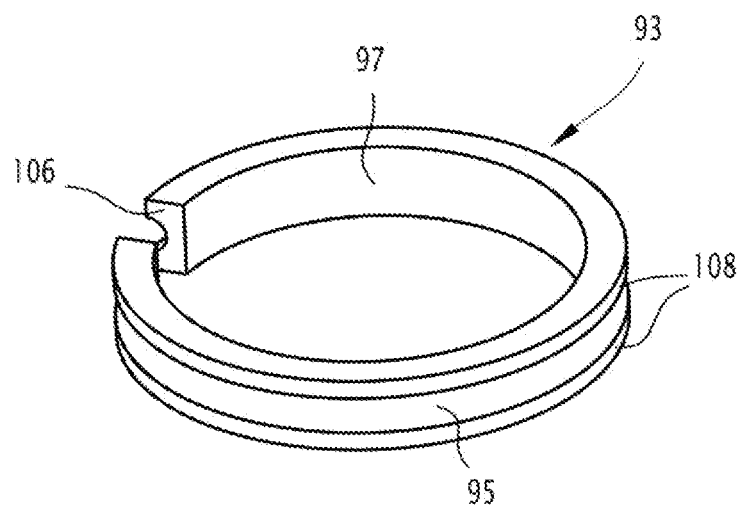

[Fig 6]
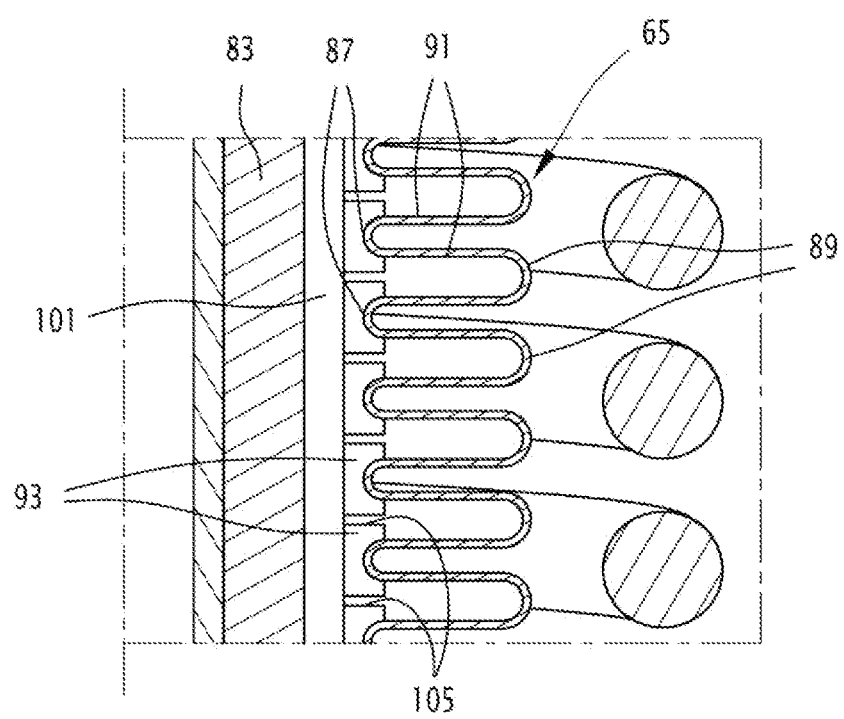

[Fig 7]
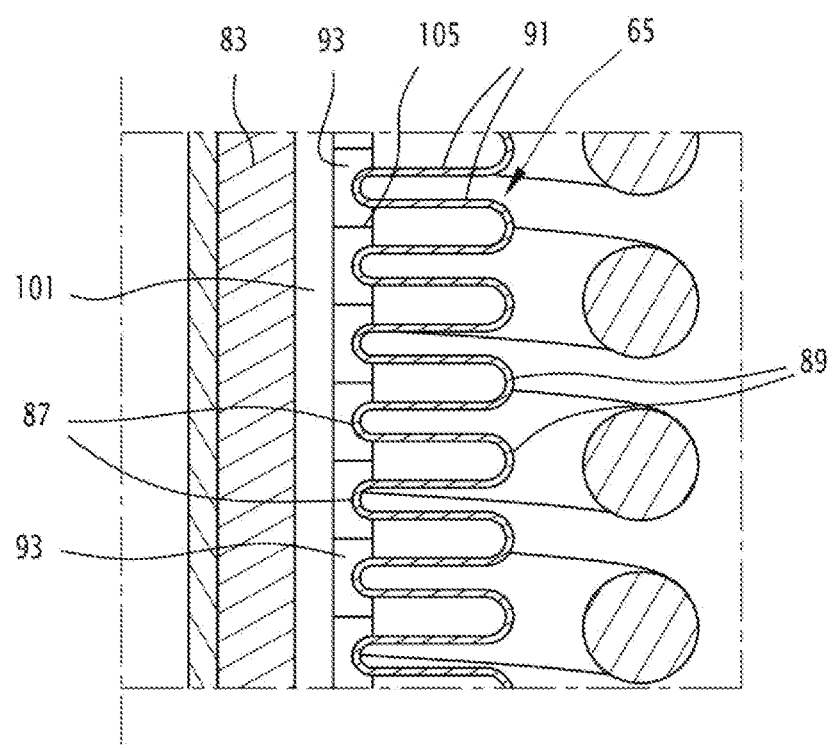

[Fig 8]
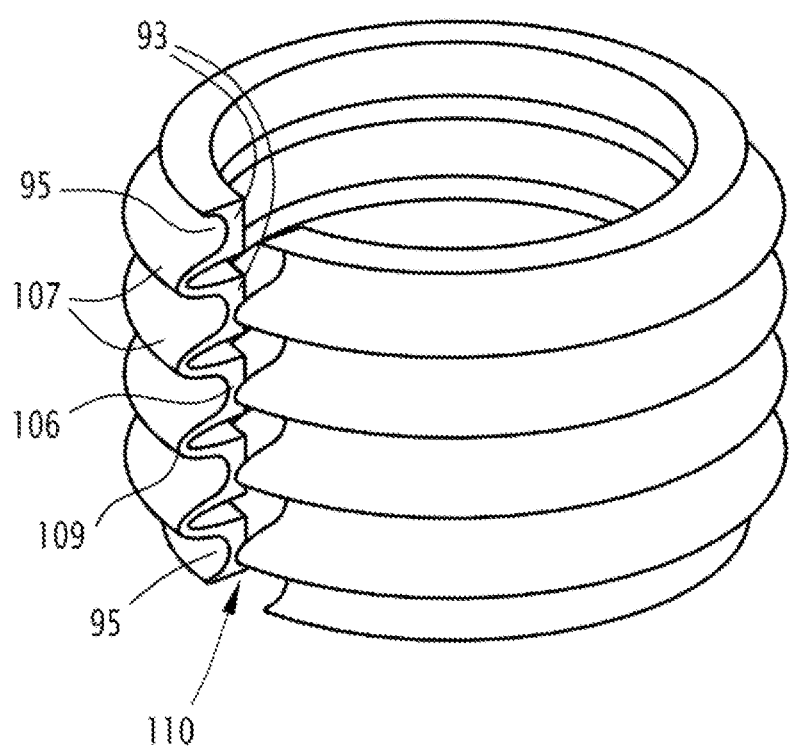

[Fig 9]
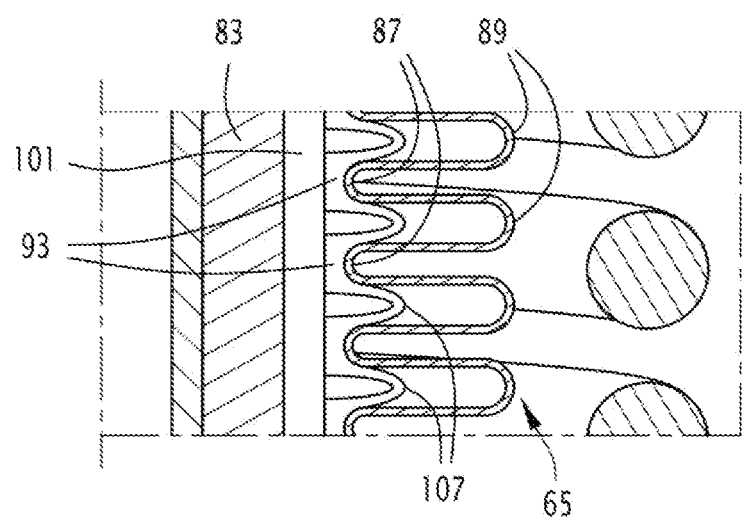

[Fig 10]
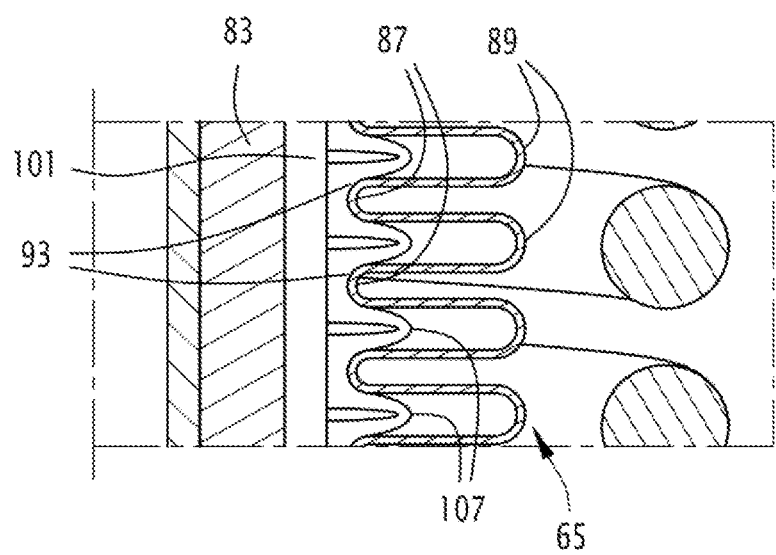

[Fig 11]
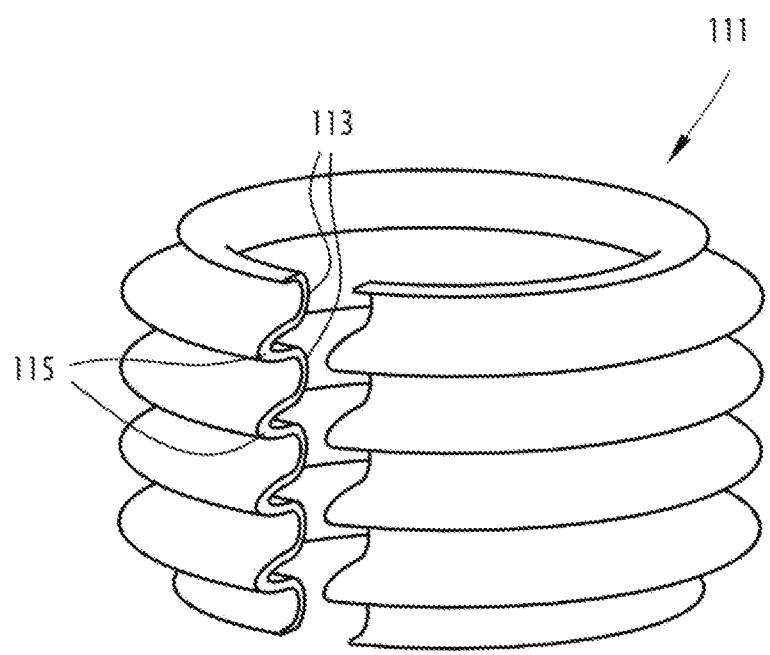

[Fig 12]
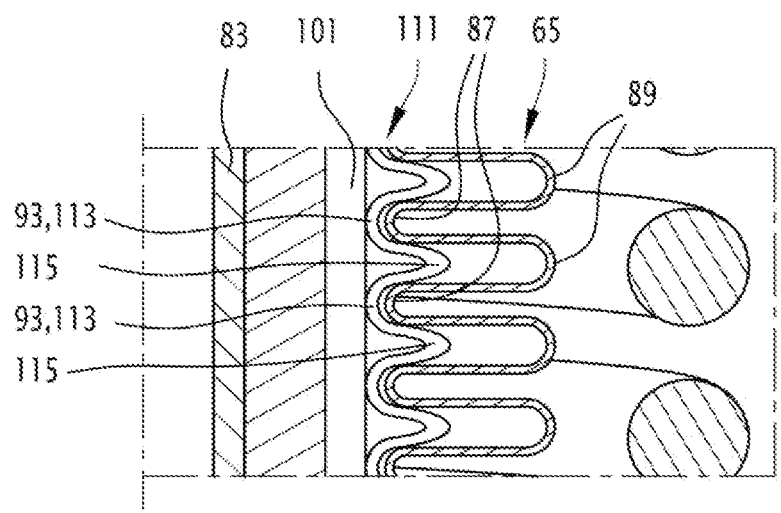

[Fig 13]
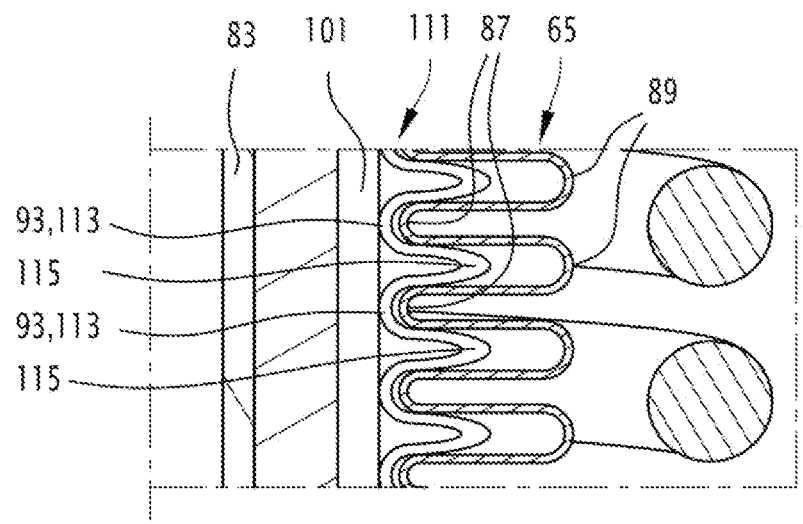

[Fig 14]
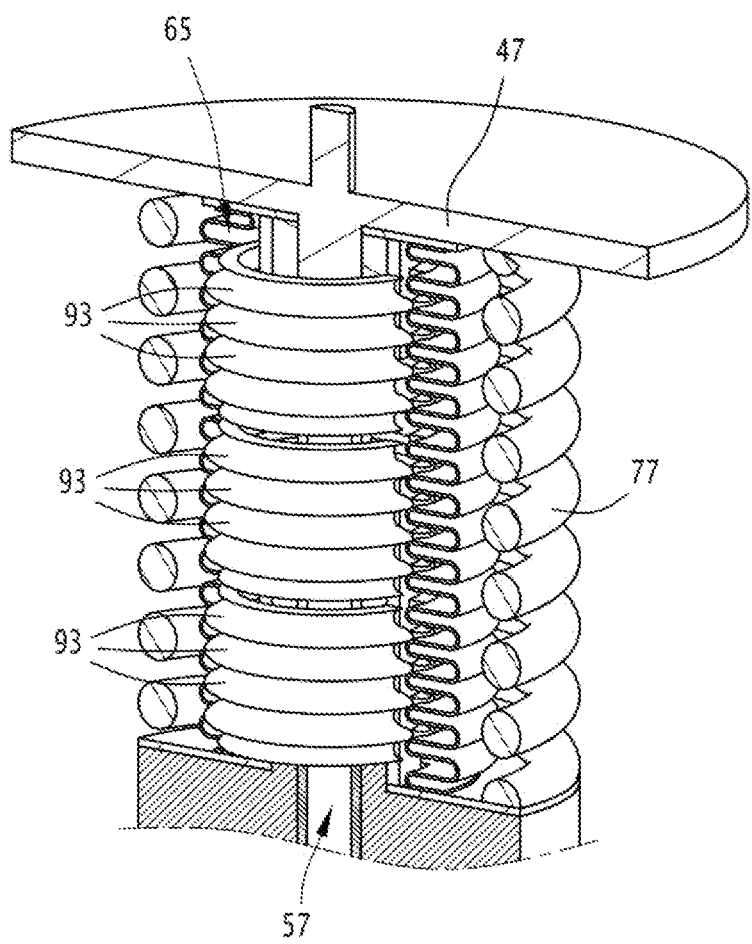

CRYOGENIC VALVE

CROSS-REFERENCE TO RELATED APPLICATION

This application is a U.S. non-provisional application claiming the benefit of French Application No. 23 03981, filed on Apr. 20, 2023, which is incorporated herein by reference in its entirety.

TECHNICAL FIELD

The disclosure generally relates to cryogenic valves.

More specifically, the disclosure comprises a cryogenic valve comprising: a valve body having a cryogenic fluid inlet, a cryogenic fluid outlet, and a cryogenic fluid passage fluidically connecting the cryogenic fluid inlet to the cryogenic fluid outlet; a plug; an actuator; a kinematic chain via which the plug is displaced by the actuator between a position sealing the cryogenic fluid passage and a position unsealing the cryogenic fluid passage, the kinematic chain comprising a driving member displaced by the actuator along an axis of displacement and a transmission structure transmitting the movement of the driving member to the plug; a tubular bellows arranged around the transmission structure, having a first end connected to the driving member and a second end connected to the valve body.

BACKGROUND

The transmission structure typically comprises a rod, engaged through an orifice opening into the cryogenic fluid passage. The orifice is delimited by a guide formed on the valve body, making it possible to guide the displacement of the rod. The tubular bellows makes it possible to avoid any leaks of cryogenic fluid to the outside of the valve, along the rod.

The valve is, for example, intended to be integrated into a cryogenic hydrogen supply assembly of a fuel cell.

It is, for example, of the type described in the patent application filed under number FR 22 04567.

Such a valve is provided with a double shell wherein a heat transfer fluid circulates, making it possible to prevent the surfaces of the valve in contact with hydrogen, at very low temperature, from being exposed to the external atmosphere. This could cause the liquefaction of the air in contact with said surfaces.

In this case, the hydrogen circulating in the cryogenic fluid passage can reach a temperature which can drop to 20 K, it being possible for its pressure to vary from 3 to 20 bars. The volume inside the tubular bellows is filled with hydrogen in the gaseous state.

Because of the presence of the double shell for heat transfer fluid circulation, the temperature around the valve body, at the coldest point, is of the order of −50° C.

The tubular bellows, for its part, is at a temperature very close to the temperature of the heat transfer fluid circulating in the double shell because there is practically no circulation of hydrogen between the cryogenic fluid circulation passage and the volume delimited internally by the tubular bellows.

The plug of the cryogenic valve typically has a travel of 5 mm between its sealing position and its unsealing position so as to allow the circulation of the cryogenic hydrogen without creating significant counterpressure.

The tubular bellows is typically obtained by hydroforming, from a sheet of 304Ti austenitic stainless steel. In some cases, the tubular bellows can have two thicknesses, each thickness consisting of a sheet of austenitic stainless steel.

The sheet has a very thin thickness, typically between 0.1 and 0.3 mm, in order to have the required flexibility, even at low temperature. Before the hydroforming step, each sheet is rolled and welded so as to obtain a tube subsequently shaped by hydroforming. Indeed, it is virtually impossible to obtain an extruded tube of very small thickness.

The cryogenic valve must open each time the fuel cell is switched on and close each time the fuel cell is switched off. For a lifetime of the vehicle of fifteen years, the cryogenic valve will undergo approximately twenty-five thousand opening and closing cycles.

In order for the tubular bellows to be able to withstand the fatigue generated by these repeated openings, the number of corrugations in the tubular bellows can be chosen to equal 16, with an external diameter of 20 mm and an internal diameter of 12 mm, the height being approximately 34.6 mm.

Because of its method of manufacture from a welded rolled sheet, the strength of the tubular bellows is not homogeneous over its entire height. When the tubular bellows is subjected to an internal pressure, there is a chance of the tubular bellows buckling at the location where its strength will be lowest. One solution to avoid buckling is to increase the diameter of the tubular bellows. However, this has a very significant impact on the size and the total cost of the cryogenic valve such that this solution is not satisfactory.

It is also impossible to reduce the height of the tubular bellows, which is controlled by the opening travel of the plug of the cryogenic valve.

In the event of buckling, the corrugations protruding toward the interior of the tubular bellows can rub against all the structures located inside the tubular bellows each time the plug is displaced. Because of the thinness of the material from which the tubular bellows is made, there is a chance of premature wear of the tubular bellows and of it being pierced.

SUMMARY

In this context, the object of the disclosure is to propose a cryogenic valve wherein there is a lower chance of the tubular bellows being pierced.

To this end, the disclosure relates to a cryogenic valve comprising:
a valve body having a cryogenic fluid inlet, a cryogenic fluid outlet, and a cryogenic fluid passage fluidically connecting the cryogenic fluid inlet to the cryogenic fluid outlet;
a plug;
an actuator;
a kinematic chain via which the plug is displaced by the actuator between a position sealing the cryogenic fluid passage and a position unsealing the cryogenic fluid passage, the kinematic chain comprising a driving member displaced by the actuator along an axis of displacement and a transmission structure transmitting the movement of the driving member to the plug;
a tubular bellows arranged around the transmission structure, having a first end joined to the driving member and a second end joined to the valve body, the tubular bellows having internal corrugations protruding toward the interior of the tubular bellows, the tubular bellows being compressible along the axis of displacement under the effect of the displacement of the driving member;

protections made of a material with a low coefficient of friction, placed inside the tubular bellows on the internal corrugations, the protections being displaced with the internal corrugations along the axis of displacement when the driving member is displaced along the axis of displacement.

Thus, the protections protect the internal corrugations during the displacements of the plug of the cryogenic valve.

Indeed, each time the plug is displaced, the driving member is displaced along the axis of displacement, carrying the tubular bellows with it. The internal corrugations of the tubular bellows which are closest to the driving member will have a travel substantially equal to that of the plug of the cryogenic valve.

The internal corrugations closest to the end joined to the valve body will be displaced over a short travel. The intermediate internal corrugations will have a travel substantially half that of the plug of the cryogenic valve.

The protections will be displaced with the internal corrugations, and they will come into contact with the structures housed inside the tubular bellows in the event of buckling of the tubular bellows.

Because these protections are made of a material with a low coefficient of friction, these contacts will not prevent the opening and closing of the plug of the cryogenic valve.

The cryogenic valve can furthermore have one or more of the following features, considered individually or in any technically possible combinations:
   the protections are rings, each ring being mounted on one of the internal corrugations;
   the rings have a closed contour or are open;
   each protection has an external groove wherein the internal corrugation is engaged;
   the protections are independent of one another or are joined to one another by joints which are compressible in the direction of displacement;
   the valve comprises a ribbed tube placed inside the tubular bellows, the ribbed tube comprising corrugations recessed toward the tubular bellows, defining the protections;
   the transmission structure comprises a rod extending along the axis of displacement, the valve body comprising a guide guiding the rod in translation along the axis of displacement, the tubular bellows being placed around the guide with the interposition of a sleeve made of a material with a low coefficient of friction between the guide and the protections;
   the transmission structure comprises a barrel integral with the driving member to which a proximal end of the rod is attached, the tubular bellows being placed around the barrel with the interposition of another sleeve made of a material with a low coefficient of friction between the barrel and the protections;
   the protections are distributed in two to four groups, the protections of the same group being joined to one another, the protections belonging to different groups being free with respect to one another;
   the tubular bellows comprises at least one corrugated tube obtained from a welded rolled sheet, preferably with a thickness of less than 0.5 mm.

BRIEF DESCRIPTION OF THE DRAWINGS

Other features and advantages of the disclosure will become apparent from the detailed description given below, indicatively and with no limitation, with reference to the appended figures, in which:

FIG. 1 is a simplified schematic representation of an assembly comprising a fuel cell, a hydrogen store, and a supply circuit integrating a cryogenic valve according to the disclosure;

FIG. 2 is a representation in section of the cryogenic valve of FIG. 1, the protections not being shown for greater clarity;

FIG. 3 is a schematic perspective representation in section of part of the valve of FIG. 2, the protections being shown;

FIG. 4 is a perspective view of one of the protections equipping the valve of FIG. 3;

FIG. 5 is a view similar to that of FIG. 4, for an alternative embodiment of the protection;

FIGS. 6 and 7 are enlarged views of a detail of FIG. 3, showing the positions of the protections when the plug is in the sealing position and when the plug is in the unsealing position respectively;

FIG. 8 is a perspective view of the protections for a second embodiment of the disclosure;

FIGS. 9 and 10 are views similar to those of FIGS. 6 and 7, for the protections of FIG. 8;

FIG. 11 is a perspective view of the protections for a third embodiment of the disclosure;

FIGS. 12 and 13 are views similar to those of FIGS. 6 and 7, for the protections of FIG. 11; and FIG. 14 is a view similar to that of FIG. 3, for an alternative embodiment applicable to all embodiments.

DETAILED DESCRIPTION

The valve 1 is a cryogenic valve, in other words a valve intended to be inserted into a circuit wherein a cryogenic fluid circulates.

Cryogenic fluid is understood to mean a fluid at a very low temperature, which is stored at least partially in the liquid state.

In the example of FIG. 1, the cryogenic fluid is hydrogen.

In other applications, the cryogenic fluid is helium, nitrogen, a natural gas such as methane CH4, air, or any other suitable fluid.

In the example shown in FIG. 1, the cryogenic valve 1 is integrated into an assembly 3 comprising a fuel cell 5 and a cryogenic fluid storage tank 7.

The cryogenic valve 1 is inserted into a circuit 9 for supplying the fuel cell 5 with cryogenic fluid from the cryogenic fluid storage tank 7.

The circuit 9 for supplying the fuel cell 5 comprises, downstream of the cryogenic valve 1, a heater 11 which is typically a heat exchanger.

The assembly 3 is typically provided to be installed on board a vehicle having an electric propulsion motor, for example a motor vehicle, a train, a boat, or any other vehicle. The motor vehicle is, for example, a car, a utility vehicle, a truck, etc.

The fuel cell 5 is configured to produce electricity and supply the electric propulsion motor.

Conventionally, the fuel cell 5 comprises an anode gas circuit, a cooling circuit, and a cathode gas circuit, these various circuits not being shown.

The cathode gas is a gas comprising oxygen, for example air.

The anode gas is typically hydrogen. The supply circuit 9 is thus connected to the inlet of the anode gas circuit.

As can be seen in FIG. 2, the cryogenic valve 1 comprises:
   a valve body 27 delimiting a cryogenic fluid inlet 29, a cryogenic fluid outlet 31, and a cryogenic fluid passage 33 fluidically connecting the cryogenic fluid inlet 29 to the cryogenic fluid outlet 31;

a plug 37;

an actuator 39;

a kinematic chain 41 via which the plug 37 is displaced by the actuator 39 between a position sealing the cryogenic fluid passage 33 and a position unsealing the cryogenic fluid passage 33.

The cryogenic fluid inlet 29 is fluidically connected to an outlet orifice of the cryogenic fluid storage tank 7.

Advantageously, the valve body 27 further delimits a heat transfer fluid inlet 43, a heat transfer fluid outlet (not shown), and a heat transfer fluid passage 45 fluidically connecting the heat transfer fluid inlet 43 to the heat transfer fluid outlet.

Preferably, the heat transfer fluid passage 45 is arranged around the cryogenic fluid passage 33 such that the surfaces of the valve body 27 in contact with the cryogenic fluid are not directly exposed to the atmosphere surrounding the cryogenic valve 1.

For example, the heat exchanger 11 has a cryogenic fluid circulation side and a heat transfer fluid circulation side, the cryogenic fluid and the heat transfer fluid being in thermal contact with each other within the heat exchanger 11.

The cryogenic fluid circulation side has an inlet connected to the cryogenic fluid outlet 31 of the cryogenic valve 1. It also has an outlet connected to the inlet of the anode fluid circuit of the fuel cell 5.

The heat transfer fluid circulation side is, for example, connected to the cooling circuit of the fuel cell 5.

The heat transfer fluid inlet 43 and the heat transfer fluid outlet of the cryogenic valve 1 are typically fluidically bypass-connected on the heat transfer fluid circulation side of the heat exchanger 11.

The kinematic chain 41 comprises a driving member 47 displaced by the actuator 39 along an axis of displacement X, and a transmission structure 49 transmitting the movement of the driving member 47 to the plug 37 of the cryogenic valve 1.

In the example shown, the actuator 39 is of the pneumatic type. It comprises an actuator body 51 delimiting an internal space divided into two volumes by a membrane 53. The membrane 53 displaces a lug 55 protruding along the axis of displacement X out of the actuator body 51.

The driving member 47 is a plate integral with the lug 55.

The driving member 47 extends perpendicularly to the axis of displacement X. In the example shown, it is circular.

The transmission structure 49 comprises a rod 57.

The rod 57 extends along the axis of displacement X.

The rod 57 has a distal end 59 attached to the plug 37.

The transmission structure 49 further comprises a barrel 61 integral with the driving member 47.

A proximal end 63 of the rod 57 is attached to the barrel 61.

In the example shown, the barrel 61 delimits a blind housing wherein the proximal end 63 of the rod 57 is attached.

As can be seen in FIG. 2, a tubular bellows 65 is arranged around the transmission structure 49. The tubular bellows 65 has a first end 67 joined to the driving member 47 and a second end 69 joined to the valve body 27.

The tubular bellows 65 is coaxial with the axis of displacement X. It is compressible along the axis of displacement X under the effect of the displacement of the driving member 47.

More precisely, the valve body 27 has an internal partition 71 separating the heat transfer fluid passage 45 from the cryogenic fluid passage 33. This internal partition 71 has an orifice 73 traversed by the rod 57. The orifice 73 is formed in a portion 75 of the internal partition 71 substantially perpendicular to the axis of displacement X.

The tubular bellows 65 bears in sealing fashion by its second end 69 against said partition portion 75 and surrounds the orifice 73. The first end 67 of the tubular bellows 65 bears in sealing fashion against an inner face 76 of the driving member 47 which is opposite the partition portion 75. It surrounds the barrel 61.

The cryogenic valve 1 further comprises a return member 77 returning the plug 37 into its sealing position. In the example shown, the return member 77 is a helical spring coaxial with the axis of displacement X. One end of the spring bears against the partition portion 75. An opposite end bears against the inner face 76 of the driving member 47.

The helical spring 77 surrounds the tubular bellows 65 and is placed outside the latter.

It should be noted that the cryogenic valve 1 comprises a cover 79 mounted on the valve body 27. The internal volume of the cover 79 communicates with the heat transfer fluid circulation passage 45 via an opening 81 formed in the valve body 27.

The opening 81 is opposite the partition portion 75 along the axis of displacement X. The return member 77, the tubular bellows 65, and the rod 57 traverse the opening 81 and are housed inside the cover 79.

The valve body 27 comprises a guide 83 guiding the rod 57 in translation along the axis of displacement X.

The guide 83 is a tubular portion of the valve body 27, extending along the axis of displacement X from the partition portion 75. It delimits a passage 85 extending the orifice 73 toward the driving member 47. The internal section of this passage 85 is substantially identical to the external section of the rod 57.

The tubular bellows 65 is placed around the guide 83.

The tubular bellows 65 is also placed around the barrel 61.

Thus, the internal volume of the tubular bellows 65 is filled with the gaseous hydrogen, the latter penetrating between the guide 83 and the rod 57 from the cryogenic fluid passage 33.

On the other hand, the volume located outside the tubular bellows 65 is filled with the heat transfer fluid.

As can be seen more clearly in FIGS. 3 to 6, the tubular bellows 65 comprises internal corrugations 87 protruding toward the interior of the tubular bellows 65. It also comprises external corrugations 89 protruding toward the outside of the tubular bellows 65.

Each internal corrugation 87 is connected to two external corrugations 89, and reciprocally each external corrugation 89 is connected to two internal corrugations 87.

The internal corrugations 87 each extend along a closed contour around the axis of displacement X.

Considered in section in a plane containing the axis of displacement X, they substantially have a semi-circular section open on the side facing away from the axis of displacement X.

In the same way, the external corrugations 89 each extend along a closed contour entirely around the axis of displacement X.

Considered in section in a plane containing the axis of displacement X, as in FIGS. 6 and 7, the external corrugations 89 have a semi-circular shape open on the side facing the axis of displacement X.

The internal corrugations 87 are distributed along the axis of displacement X and spaced apart from one another axially. Similarly, the external corrugations 89 are distributed along the axis of displacement X and are placed axially between the internal corrugations 87.

The internal corrugations 87 and the external corrugations 89 are connected to one another by substantially annular portions 91 of the tubular bellows 65, extending in planes perpendicular to the axis of displacement X.

According to the disclosure, protections 93 made of a material with a low coefficient of friction are placed inside the tubular bellows 65 on the internal corrugations 87.

The protections 93 are displaced with the internal corrugations 87 along the axis of displacement X when the driving member 47 is displaced along the axis of displacement X.

According to a first embodiment shown in FIGS. 3 to 7, the protections 93 are rings, each ring being mounted on one of the internal corrugations 87.

As shown in FIG. 4, the rings have a closed contour.

Each protection 93 has an external groove 95 wherein the internal corrugation 87 is engaged.

More specifically, the protection 93 is circular and centered on the axis of displacement X.

Considered in section in a plane containing the axis of displacement X, it has a substantially rectangular shape, as can be seen more clearly in FIGS. 6 and 7.

Thus, it is delimited radially inwardly by a substantially cylindrical inner surface 97.

The external groove 95 is recessed in a radially outer surface 98 of the protection 93.

Considered in section in a plane containing the axis of displacement X, the external groove 95 has an internal section of the same shape as the external section of the internal corrugation 87.

The radially inner 97 and radially outer 98 surfaces of the protections 93 are connected to one another by substantially planar edge faces 99 which lie within planes perpendicular to the axis of displacement X.

The protections 93 are independent of one another. This means that the protections 93 are not integral with one another and are not connected directly to one another by material bridges. They are free with respect to one another.

The protections 93 are made of a material which is particularly resistant to friction, is compatible with the cryogenic fluid, and has sufficient rigidity.

For example, the protections 93 are made of polytetrafluoroethylene (PTFE) or Teflon.

Preferably, a sleeve 101 made of a material with a low coefficient of friction is interposed between the guide 83 and the protections 93.

The sleeve 101 is cylindrical, coaxial with the axis of displacement X. It is placed over the external surface of the guide 83. In other words, it is threaded around the guide 83 and is applied against the outer surface thereof.

For example, the sleeve is made of PTFE or a metal with a particularly low degree of roughness.

Likewise, another sleeve 103 is interposed between the barrel 61 and the protections 93.

The other sleeve 103 is cylindrical and coaxial with the axis of displacement X. It is placed against the outer surface of the barrel 61. In other words, it is threaded around the barrel 61 and applied against the outer surface of the latter.

It is advantageously made of the same material as the sleeve 101.

It should be noted that the barrel 61 is spaced from the guide 83, with a spacing at least equal to the travel of the plug 37 when the latter passes from its sealing position to its unsealing position.

The protections 93 are threaded around the sleeve 101 and around the other sleeve 103. Their inner surfaces 97 have a diameter substantially equal to or slightly greater than the external diameter of the sleeve 101 and the external diameter of the other sleeve 103.

When the tubular bellows 65 undergoes compression related to the axial displacement of the driving member 47, the inner surface 97 of the protections 93 slides against the outer surface of the sleeve 101 or the other sleeve 103.

This situation is shown in FIGS. 6 and 7.

FIG. 6 shows the positions of the protections 93 when the plug 37 is in its sealing position. The protections 93 are spaced apart axially from one another and separated by gaps 105.

When the plug 37 is displaced by the actuator from its sealing position to its unsealing position, the driving member 47 is displaced axially along the displacement axis X. It pushes the rod 57 and compresses the tubular bellows 65. Therefore, the internal corrugations 87 move closer to one another.

It should be noted that the internal corrugations 87 closest to the driving member 47, in other words located at the first end 67 of the tubular bellows 65, will be displaced with a travel corresponding substantially to that of the driving member 47, itself substantially equal to the travel of the plug 37. The internal corrugations 87 located at the second end 69 of the tubular bellows 65, which end is attached to the valve body 27, are barely displaced. The intermediate internal corrugations 87 will be displaced with a shorter travel than the internal corrugations located at the first end 67 of the tubular bellows 65.

Thus, the amounts of travel of the various protections 93 differ and increase the closer to the driving member 47.

The situation when the plug 37 has reached its unsealing position is shown in FIG. 7. The protections 93 are located immediately next to one another and typically touch one another. Their edge faces 99 are in contact with one another.

According to a variant of the first embodiment shown in FIG. 5, the protections 93 are open rings.

These rings have substantially the same shape as those described above, apart from the fact that they have an interruption 106 of small angular width, as shown in FIG. 5.

The variant of FIG. 5 facilitates the placing of the protections 93 over the internal corrugations 87. The external groove 95 can, in this case, be deeper than for the closed rings.

A second embodiment of the disclosure will now be described with reference to FIGS. 8 to 10. Only the points in which this second embodiment differs from the first will be detailed below.

Elements that are identical or that provide the same functions in the two embodiments will be designated by the same reference signs.

In the embodiment of FIGS. 3 to 7, the protections 93 are independent of one another.

In the second embodiment, the protections 93 are joined to one another by joints 107 which are compressible along the axis of displacement X.

The protections 93 have substantially the same shape as in the first embodiment.

The compressible joints 107 are made of the same material as the protections 93.

The compressible joints 107 are material bridges connecting the protections 93 to one another. They are integral with the protections 93.

The compressible joints 107 are preferably membranes.

As can be seen in FIGS. 4 and 5, the groove 95 of each protection is delimited by two edges 108. Each edge 108 is located along and opposite one of the edges 108 of the neighboring protection 93. As shown in FIGS. 8 to 10, the compressible joint 107 connects said edge 108 to the opposite edge 108 belonging to the neighboring protection 93.

Thus, each protection 93 is connected by its two edges 108 to the protections 93 located axially on either side via the compressible joints 107.

Considered in section in a plane containing the axis of displacement X, the compressible joints 107 have a substantially V shape, pointing radially away from the axis of displacement X.

As can be seen in FIGS. 9 and 10, the compressible joints 107 are each engaged in the space delimited between two internal corrugations 87. This facilitates the protections 93 being carried along, along the axis of displacement X, during the compression or extension of the tubular bellows 65.

FIG. 9 shows the situation when the plug 37 is in its sealing position.

The protections 93 are spaced apart from one another along the axis of displacement X and separated by gaps 105. The compressible joints 107 each have relatively open V-shaped sections.

FIG. 10 shows the situation when the plug 37 is in its unsealing position. The internal corrugations 87 have moved closer to one another axially. Therefore, the protections 93 have also moved closer to one another, under the effect of the compression of the tubular bellows 65. However, they are not in contact with one another via their edge faces 99. A small gap remains between the protections 93. The compressible joints 107 have, in section, a V-shape which is less open than in the situation of FIG. 9.

As in the first embodiment, the protections 93 are advantageously open rings and have interruptions 106. The compressible joints 107 also have interruptions 109. The interruptions 106 and 109 are axially aligned. Together, the protections 93 and the compressible joints 107 form a split tube. This tube has a slot 110 extending axially over its entire length.

The presence of the slot 110 facilitates the placing of the protections 93 over the internal corrugations 87.

According to a variant which is not shown, the protections 93 are closed rings. The compressible joints 107 have a closed contour. Together, the protections 93 and the compressible joints 107 form a closed tube.

To facilitate the placing of the protections 93 over the internal corrugations 87, the external grooves 95 are less deep than in the alternative embodiment where the protections 93 and the compressible joints 107 form an open tube.

A third embodiment of the disclosure will now be detailed with reference to FIGS. 11 to 13.

Only the points in which the third embodiment differs from the first embodiment will be detailed below. Elements that are identical or provide the same functions will be designated by the same reference signs.

In the third embodiment, the cryogenic valve 1 comprises a ribbed tube 111 placed inside the tubular bellows 65.

The ribbed tube 111 is substantially coaxial with the axis of displacement X. The ribbed tube 111 comprises corrugations 113 recessed toward the tubular bellows 65.

It also comprises corrugations 115 protruding toward the tubular bellows 65.

Each recessed corrugation 113 is annular and extends around the axis of displacement X. Likewise, each protruding corrugation 115 is annular and extends around the axis of displacement X. The recessed corrugations 113 are spaced apart axially from one another, the protruding corrugations 115 each being placed between two recessed corrugations 113.

In other words, the protruding corrugations 115 connect the recessed corrugations 113 in pairs, and the recessed corrugations 113 connect the protruding corrugations 115 in pairs.

Considered in section in a plane containing the axis of displacement X, the ribbed tube 111 has a corrugated form.

The recessed corrugations 113, considered in section in a plane containing the axis of displacement X, have the shape of an arc of a circle. Likewise, the protruding corrugations 115, considered in section in a plane containing the axis of displacement X, have the shape of an arc of a circle.

The recessed corrugations 113 define the protections 93.

In other words, each internal corrugation 87 is housed in a recessed corrugation 113.

The protruding corrugations 115 are each engaged between two internal corrugations 87 adjacent to each other.

As can be seen in FIGS. 12 and 13, the top of the recessed corrugations 113 is positioned on the sleeve 101 or on the other sleeve 103, except for the recessed corrugations 113 situated in the gap between the two sleeves 101, 103.

FIG. 12 shows the situation when the plug 37 is in its sealing position. The axial spacing between the recessed corrugations 113 corresponds substantially to the axial spacing between the internal corrugations 87. In section, the ribbed tube 111 has a sinusoidal shape.

FIG. 13 shows the situation when the plug 37 occupies its unsealing position. The recessed corrugations 113 are axially closer together than in FIG. 12, as are the internal corrugations 87. Considered in section, the ribbed tube 111 has a sinusoidal shape, of a shorter period than in FIG. 12.

The ribbed tube 111, in the example of FIG. 11, is split over its entire height.

In a variant, it is closed.

According to an alternative embodiment shown in FIG. 14, the protections 93 are distributed in two to four groups, the protections 93 of the same group being joined to one another.

The protections 93 belonging to different groups are free relative to one another.

In the example of FIG. 14, the protections 93 are distributed in three groups.

The protections 93 of the same group are joined to one another by material bridges. They are typically integral with one another.

On the contrary, there is no direct mechanical join, for example by material bridges, between the various groups of protections 93. Each group of protections 93 forms a cylindrical body, coaxial with the axis of displacement X, independent of the other bodies.

In this alternative embodiment, there is a gap between the groups of protections 93. The internal corrugations 87 situated level with this gap are not equipped with protection 93.

As noted in the preamble of the present description, the tubular bellows 65 comprises at least one corrugated tube obtained from a welded rolled sheet.

For example, the tubular bellows 65 consists of a single corrugated tube. In a variant, the tubular bellows 65 comprises two corrugated tubes fitted one inside the other and of the same shape.

Each corrugated tube preferably has a thickness of between 0.1 and 0.5 mm, more precisely between 0.1 and 0.4 mm, and advantageously substantially equal to 0.3 mm.

Each corrugated tube is made of 304 Ti austenitic stainless steel.

For example, the tubular bellows 65 has sixteen internal corrugations 87 and sixteen external corrugations 89. The external diameter of the tubular bellows 65, measured at the external corrugations 89, is approximately 20 mm. The internal diameter, measured at the internal corrugations 87, is approximately 12 mm. The tubular bellows 65 has axially a height of 34.6 mm.

The travel of the plug 37 between its sealing position and its unsealing position is axially approximately 5 mm.

The valve described above has multiple advantages.

Ring-shaped protections are particularly well suited to protecting the internal corrugations.

When the rings are open, it is particularly easy to mount them on the internal corrugations.

When each protection has an external groove wherein the internal corrugation is engaged, the mounting of the protection on the internal corrugation is facilitated, and the protection naturally follows the axial displacement of the internal corrugation.

When the protections are independent of one another, they easily follow the displacement of the internal corrugations, and the resistance to the opening or closing of the plug is reduced.

When the protections are joined to one another by compressible joints, the number of parts to be managed is reduced.

When the valve comprises a ribbed tube placed inside the tubular bellows, the corrugations of which, recessed toward the tubular bellows, define the protections, the production cost is reduced.

The sleeve made of material with a low coefficient of friction inserted between the guide of the rod and the protections makes it possible to reduce the wear of the protections.

Likewise, the other sleeve made of a material with a low coefficient of friction, arranged between the barrel carried by the driving member and the protections, also makes it possible to reduce the wear of the protections.

When the tubular bellows comprises at least one corrugated tube, obtained from a welded rolled sheet, the buckling of the tubular bellows which can result from a less strong zone of the tubular bellows does not cause premature wear of this tubular bellows. Buckling is manifested simply by the protections bearing against the elements located inside the tubular bellows in a more pronounced fashion.

The cryogenic valve can have multiple variants.

It may not comprise a passage for a heat transfer fluid.

The actuator and the kinematic chain can be of any suitable type. The actuator can be an electric actuator, or any other type of suitable actuator. The driving member is not necessarily a plate and can be a rod, a membrane, etc. The transmission structure may comprise gears.

The disclosure has been illustrated and described in detail in the drawings and the preceding description. This must be considered as illustrative and given by way of example and not as limiting the disclosure to this only description. Many alternative embodiments are possible.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A cryogenic valve comprising:
   a valve body having a cryogenic fluid inlet, a cryogenic fluid outlet, and a cryogenic fluid passage fluidically connecting the cryogenic fluid inlet to the cryogenic fluid outlet;
   a plug;
   an actuator;
   a kinematic chain via which the plug is displaced by the actuator between a position sealing the cryogenic fluid passage and a position unsealing the cryogenic fluid passage, the kinematic chain comprising a driving member displaced by the actuator along an axis of displacement and a transmission structure transmitting movement of the driving member to the plug;
   a tubular bellows arranged around the transmission structure and having a first end joined to the driving member and a second end joined to the valve body, the tubular bellows having internal corrugations protruding toward an interior of the tubular bellows, the tubular bellows being compressible along the axis of displacement under an effect of a displacement of the driving member;
   protections made of a material with a low coefficient of friction and placed inside the tubular bellows on the internal corrugations, the protections being displaced with the internal corrugations along the axis of displacement when the driving member is displaced along the axis of displacement; and
   wherein the transmission structure comprises a rod extending along the axis of displacement, the valve body comprising a guide guiding the rod in translation along the axis of displacement, the tubular bellows being placed around the guide with an interposition of a sleeve made of a material with a low coefficient of friction between the guide and the protections, respective inner surfaces of the protections sliding against an outer surface of the sleeve.

2. The cryogenic valve according to claim 1, wherein the protections are rings, each of the rings being mounted on one of the internal corrugations.

3. The cryogenic valve according to claim 2, wherein the rings have a closed contour.

4. The cryogenic valve according to claim 2, wherein each of the protections has an external groove within which the internal corrugations are engaged.

5. The cryogenic valve according to claim 2, wherein the protections are independent of one another.

6. The cryogenic valve according to claim 2, wherein the rings are open.

7. The cryogenic valve according to claim 1, wherein the valve body comprises a ribbed tube placed inside the tubular bellows, the ribbed tube comprising corrugations recessed toward the tubular bellows and defining the protections.

8. The cryogenic valve according to claim 1, wherein the transmission structure comprises a barrel integral with the driving member to which a proximal end of the rod is attached, the tubular bellows being placed around the barrel with an interposition of another sleeve made of a material with a low coefficient of friction between the barrel and the protections.

9. The cryogenic valve according to claim 1, wherein the tubular bellows comprises at least one corrugated tube, obtained from a welded rolled sheet.

10. The cryogenic valve according to claim 9, wherein the welded rolled sheet has a thickness of less than 0.5 mm.

11. The cryogenic valve according to claim 1, wherein the guide is a tubular part, the sleeve being another tubular element, distinct from the guide.

12. The cryogenic valve according to claim 1, wherein the guide is a tubular part, the sleeve being another tubular element independent from the valve body.

13. A cryogenic valve comprising:
a valve body having a cryogenic fluid inlet, a cryogenic fluid outlet, and a cryogenic fluid passage fluidically connecting the cryogenic fluid inlet to the cryogenic fluid outlet;
a plug;
an actuator;
a kinematic chain via which the plug is displaced by the actuator between a position sealing the cryogenic fluid passage and a position unsealing the cryogenic fluid passage, the kinematic chain comprising a driving member displaced by the actuator along an axis of displacement and a transmission structure transmitting movement of the driving member to the plug;
a tubular bellows arranged around the transmission structure and having a first end joined to the driving member and a second end joined to the valve body, the tubular bellows having internal corrugations protruding toward an interior of the tubular bellows, the tubular bellows being compressible along the axis of displacement under an effect of a displacement of the driving member;
protections made of a material with a low coefficient of friction and placed inside the tubular bellows on the internal corrugations, the protections being displaced with the internal corrugations along the axis of displacement when the driving member is displaced along the axis of displacement;
wherein each protection is mounted on a single internal corrugation, the single internal corrugation being protected by only one protection;
wherein the protections are distributed in two to four groups, each group comprising several protections, the protections of the same group being connected to each other, the protections belonging to different groups being free relative to one another;
wherein the protections of the same group are joined to one another by material bridges and are integral with one another; and
wherein there is no direct mechanical join between the various groups of protections.

14. A cryogenic valve comprising:
a valve body having a cryogenic fluid inlet, a cryogenic fluid outlet, and a cryogenic fluid passage fluidically connecting the cryogenic fluid inlet to the cryogenic fluid outlet;
a plug;
an actuator;
a kinematic chain via which the plug is displaced by the actuator between a position sealing the cryogenic fluid passage and a position unsealing the cryogenic fluid passage, the kinematic chain comprising a driving member displaced by the actuator along an axis of displacement and a transmission structure transmitting movement of the driving member to the plug;
a tubular bellows arranged around the transmission structure and having a first end joined to the driving member and a second end joined to the valve body, the tubular bellows having internal corrugations protruding toward an interior of the tubular bellows, the tubular bellows being compressible along the axis of displacement under an effect of a displacement of the driving member;
protections made of a material with a low coefficient of friction and placed inside the tubular bellows on the internal corrugations, the protections being displaced with the internal corrugations along the axis of displacement when the driving member is displaced along the axis of displacement;
wherein the protections are rings, each of the rings being mounted on one of the internal corrugations;
wherein the protections are joined to one another by joints which are compressible in a direction of displacement;
the joints being material bridges connecting the protections to one another;
the joints being integral with the protections; and
the joints, when considered in section in a plane containing the axis of displacement, having a substantially V shape, pointing radially away from the axis of displacement.

* * * * *